United States Patent

Smith et al.

[11] Patent Number: 5,147,994
[45] Date of Patent: Sep. 15, 1992

[54] MICROWAVE VENDING MACHINE

[75] Inventors: Donald P. Smith; Michael J. Dobie, both of Dallas; Alden B. Sparman, Sr.; John R. Norris, both of Plano, all of Tex.

[73] Assignee: Patentsmith Corporation, Dallas, Tex.

[21] Appl. No.: 463,279

[22] Filed: Jan. 10, 1990

[51] Int. Cl.5 .................................. B23K 15/10
[52] U.S. Cl. ..................... 219/10.55 R; 219/10.55 A; 219/10.55 D; 219/10.55 E; 219/10.55 F; 219/10.55 M; 221/150 A; 221/150 R; 221/150 HC
[58] Field of Search ............. 219/10.55 R, 10.55 E, 219/10.55 A, 10.55 D, 10.55 F, 10.55 M, 400, 401; 221/150 A, 150 R, 150 HC

[56] References Cited

U.S. PATENT DOCUMENTS

| | | | |
|---|---|---|---|
| 3,283,113 | 11/1966 | Smith | 219/10.55 R |
| 3,333,666 | 8/1967 | Murray et al. | 219/10.55 R |
| 3,343,479 | 9/1967 | Wassberg | 219/10.55 R |
| 3,381,605 | 5/1968 | Smith | 219/10.55 R |
| 3,386,550 | 6/1968 | Murray et al. | 219/10.55 R |
| 3,397,817 | 8/1968 | Smith | 219/10.55 R |
| 3,404,620 | 10/1968 | Smith | 219/10.55 R |
| 3,442,200 | 5/1969 | Babel | 99/357 |
| 3,534,676 | 10/1970 | Rubino | 219/10.55 R |
| 3,884,213 | 5/1975 | Smith | 219/10.55 R |
| 4,004,712 | 1/1977 | Pond | 219/10.55 B |
| 4,144,438 | 3/1979 | Gelman et al. | 219/10.55 E |
| 4,154,861 | 5/1979 | Smith | 219/10.55 E |
| 4,190,757 | 2/1980 | Turpin et al. | 219/10.55 E |
| 4,289,792 | 9/1981 | Smith | 219/10.55 R |
| 4,337,116 | 6/1982 | Foster et al. | 219/10.55 E |
| 4,374,318 | 2/1983 | Gilliom | 219/400 |
| 4,398,651 | 8/1983 | Kumpfer | 219/10.55 R |
| 4,409,453 | 10/1983 | Smith | 219/10.55 A |
| 4,592,485 | 6/1986 | Anderson et al. | 219/10.55 R |
| 4,626,641 | 12/1986 | Brown | 219/10.55 E |
| 4,745,249 | 5/1988 | Daniels | 219/10.55 E |
| 4,762,250 | 8/1988 | Friberg | 221/123 |
| 4,783,582 | 11/1988 | Wada et al. | 219/10.55 R |
| 4,784,292 | 11/1988 | Johndrow et al. | 221/101 |
| 4,835,351 | 5/1989 | Smith et al. | 219/10.55 R |
| 4,940,869 | 7/1990 | Scholtes et al. | 219/10.55 F |
| 5,011,042 | 4/1991 | Bunce et al. | 221/150 A |

Primary Examiner—Bruce A. Reynolds
Assistant Examiner—Tu Hoang
Attorney, Agent, or Firm—Crutsinger & Booth

[57] ABSTRACT

A method and apparatus for vending a hot food product wherein a sealed container is moved from a protective sleeve and deposited in an oven where heat is transferred to the container for initially melting a protective sealing film and then heating the food product. After the food product has been heated, the container is removed from the oven and reinserted into the protective sleeve prior to dispensing the heated food product.

33 Claims, 15 Drawing Sheets

MICROWAVE VENDING MACHINE

TECHNICAL FIELD

The disclosed invention relates to a hot meal vending device which employs a combination of microwave and convection heating.

BACKGROUND OF INVENTION

Vending machines for dispensing hot and cold drinks, candy, cookies, potato chips and other snack foods have enjoyed significant commercial success. However, vending machines for dispensing meals have been limited to dispensers of refrigerated foods such as sandwiches, salads and the like.

Devices heretofore devised for incorporating electronic ovens in food vending machines are disclosed in U.S. Pat. No. 3,333,666; U.S. Pat. No. 3,343,479; U.S. Pat. No. 3,386,550; U.S. Pat. No. 3,397,817; U.S. Pat. No. 3,534,676; U.S. Pat. No. 4,004,712; U.S. Pat. No. 4,398,651; U.S. Pat. No. 4,592,485; U.S. Pat. No. 4,762,250; U.S. Pat. No. 4,783,582 and U.S. Pat. No. 4,784,292.

Vending machines for hot meals generally include a refrigerated compartment for preserving food, a microwave oven compartment for fast cooking, and a conveyor for transferring food from the refrigerated compartment into the microwave oven. However, since vending machines for hot foods have enjoyed very limited commercial success, separate microwave ovens for heating food items removed from a refrigerator are commonly employed in convenience stores, airports, cafeterias and other food vending operations.

Microwave heating of certain foods, including pizza and sandwiches which contain dough and bakery products, typically leaves the surface too moist and less palatable than similar food products cooked in other types of ovens.

Ovens of the type disclosed in U.S. Pat. No. 3,884,213; U.S. Pat. No. 4,154,861; U.S. Pat. No. 4,289,792; U.S. Pat. No. 4,409,453 and U.S. Pat. No. 4,835,351 employ air jets which impinge upon the surface of a food product to provide surface heating of the product in combination with microwave heating. Jet impingement ovens have enjoyed significant success in commercial food service and commercial food processing operations. However, a long felt need exists for apparatus for quickly and efficiently heating food products which require little or no preparation for use in a vending machine for hot meals.

SUMMARY OF THE INVENTION

The vending machine for hot foods includes an oven cabinet having an interior divided by a perforated plate to prevent transfer of microwave energy from a cooking compartment to an air conditioning compartment in the cabinet. The conditioning chamber houses air circulating apparatus to recirculate temperature controlled air from the conditioning chamber through the cooking chamber to facilitate crisping and browning to provide a desired surface texture. Microwave heating apparatus communicates with the cooking chamber to provide rapid heating of the food by electro-magnetic excitation.

A method for controlling the temperature and surface texture of a product includes the steps of: positioning a product in a container having upwardly extending sides and a bottom; positioning the product and container in a temperature controlled atmosphere; supporting the product above the bottom of the container; and forming a region of controlled air pressure alternately adjacent opposite sides of the product by directing air to flow alternately adjacent opposite sides of the product such that temperature controlled air flows between the lower surface of the product and the bottom of the container.

DESCRIPTION OF DRAWINGS

Drawings of a preferred embodiment of the microwave vending machine are annexed hereto so that the invention may be better and more fully understood, in which.

Numeral references are employed to designate like parts throughout the various figures of the drawing.

DESCRIPTION OF PREFERRED EMBODIMENT

Figure 13:
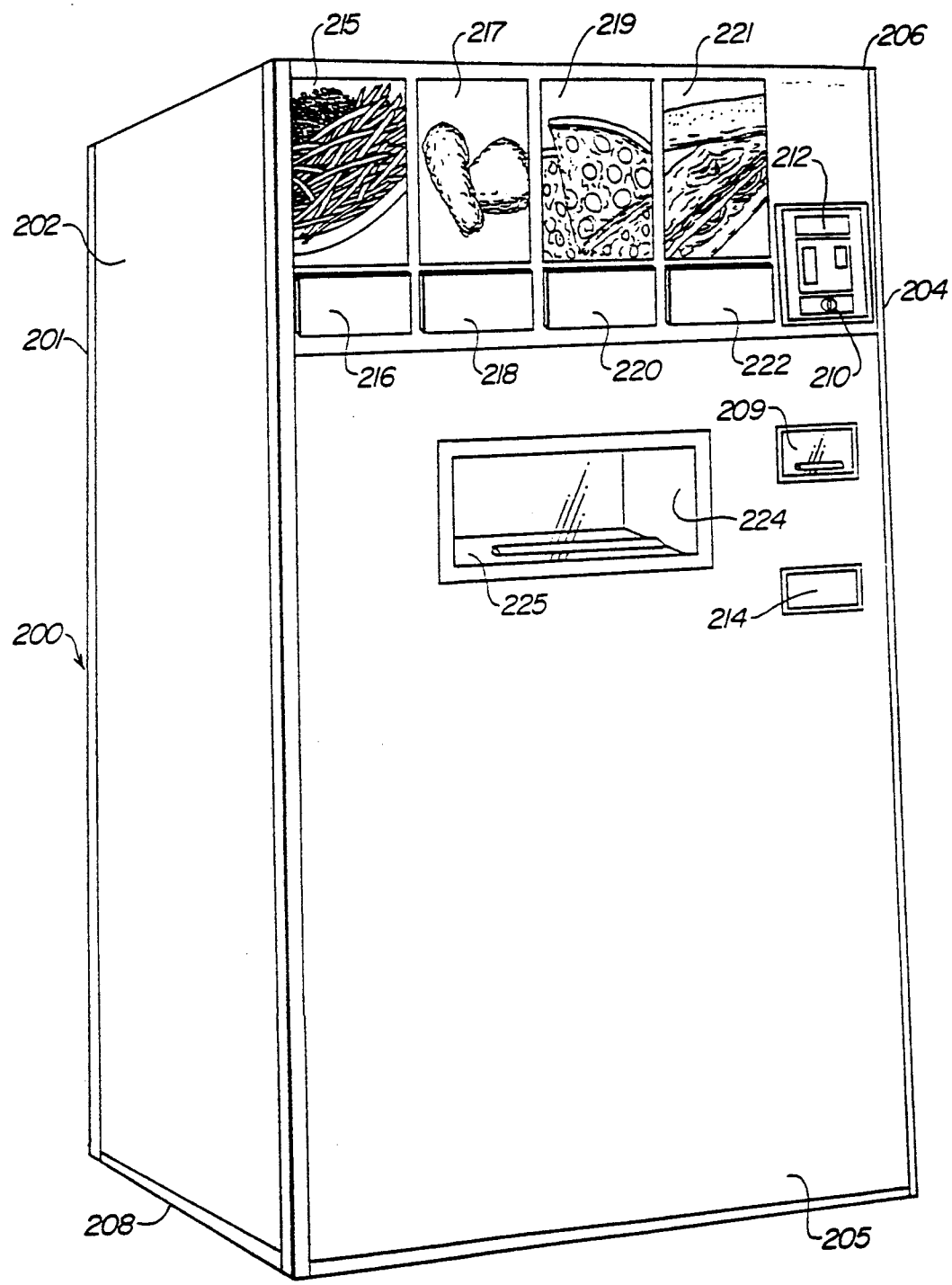
FIG. 13 is a perspective view of the external vending machine cabinet.

Referring to FIGS. 1, 4, 7 and 13 of the drawings, the numeral 10 generally designates a package which is moved by package handling apparatus 40 into and out of an oven 70 in a vending machine 200. As will be hereinafter more fully explained, a source 90 of electromagnetic radiation and air circulating apparatus 100 are employed for heating a food product 30 selected by a consumer upon depositing the purchase price of the food product in the vending machine 200 illustrated in FIG. 13. As best illustrated in FIG. 13 of the drawing, the vending machine 200 is preferably adapted to serve, for example, hot food products 30 to a customer within about one and a half to two minutes. In the illustrated embodiments, the food products 30 may, for example, include french fried potatoes, chicken nuggets, pizza, and submarine sandwiches.

The vending machine 200 is mounted in an enclosure cabinet having a back wall 201, spaced side walls 202 and 204, a front panel 205, a top wall 206 and a bottom wall 208. The front panel 205 is preferably hingedly secured to side wall 202 and provided with a key actuated lock 210 securing the front panel 205 in a closed and locked position to prevent unauthorized access to the interior of the enclosure. A currency receiving mechanism 212 adapted to accept both coins and bills is mounted on front panel 205 along with a coin return slot 214 for returning change to the customer.

Selector plates 216, 218, 220 and 222 are mounted on the front panel 205 for use by the customer to designate the food item selected to be heated and dispensed through a delivery passage 224 closed by a protective door 225. Product identification panels 215, 217, 219 and 221 are associated with selector plates 216, 218, 220 and 222, respectively, to inform the customer what food item can be selected by touching one of the selector plates. Identification panel 215 is provided with a graphic illustration of fried potatoes permitting use of the vending machine 200 by persons who do not speak or read a particular language. Additional indicia including words, numerals or other and graphic representations may be applied to each of the panels 215, 217, 219 and 221.

A condiment holding chamber 209 is provided for holding packets of salt, pepper, sugar, ketchup, mustard and barbecue sauce.

As will be hereinafter more fully explained, a refrigerated food storage cabinet 170 is preferably mounted in the lower portion of the interior of the enclosure 200 and package handling apparatus 40 and oven 70 are mounted above and adapted to receive selected packages of food products from the refrigerated storage compartment 170 transported by an elevator 180.

Each selector plate 216, 218, 220 and 222 is preferably connected to an electrical circuit adapted to initiate a sequence of events provided that payment for the food item 30 has been received in the currency receiving mechanism 212. As will be hereinafter more fully explained, touching selector plate 220 indicates that pizza, graphically illustrated on product identification panel 219 is to be dispensed. A container 10 containing pizza will be automatically moved from the refrigerated storage compartment 170 onto an elevator 180 and delivered to the package handling apparatus 40 which will move the package 10 to oven 70 for heating and then dispense the heated product 30 through the delivery passage 224 which is accessible to the customer by raising door 225.

The electrical circuit controlling the heating of the selected food product 30 preferably includes three programmed elements for delivering a predetermined type of heating for a pre-programmed time interval to the selected food product. The programmable circuit preferably includes, for example, devices to program the heating cycle by coordination with the location of the selected food item in the storage compartment 170, a bar code or other readable mechanism on the package, and symbols displayed on or adjacent selector plates 215-221 for the user to touch. From the foregoing, it should be readily apparent that touching one of the selector plates 216, 218, 220 or 222 based on the visual selection of a food item graphically illustrated on product identification panels 215, 217, 219 or 221 initiates a programmed sequence to control the heating cycle of the selected food product 30.

Figure 7:
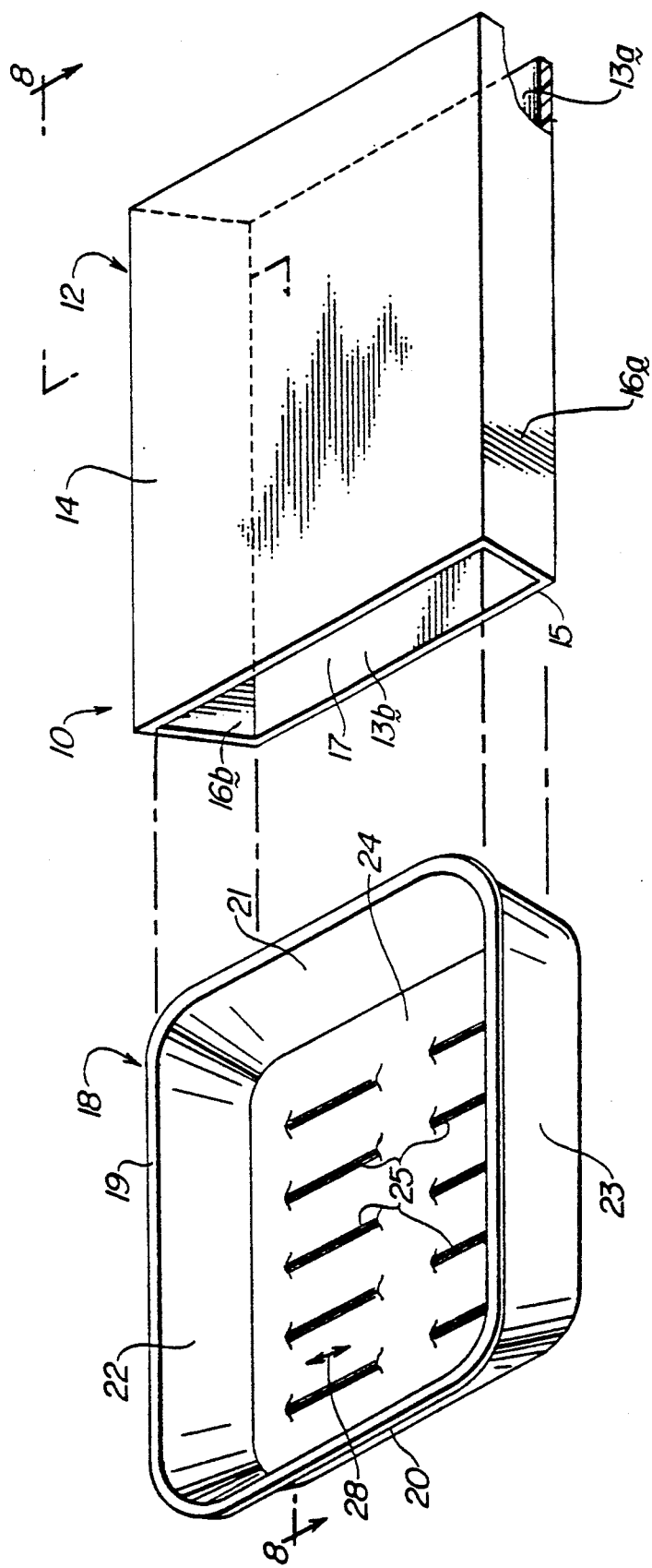
FIG. 7 is an exploded perspective view of a container and protective sleeve which form a package for a food product.
Figure 8:
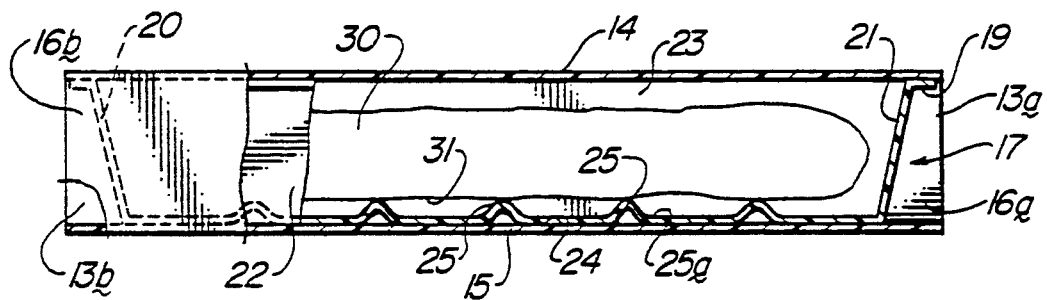
FIG. 8 is an elevational view of the package illustrated in FIG. 7, parts being broken away to more clearly illustrated details of construction.

Package 10, best illustrated in FIGS. 7 and 8, comprises a tubular sleeve 12 having open ends 13a and 13b. Sleeve 12 is formed by a top 14, bottom 15 and side walls 16a and 16b having peripheral edges connected to form an interior cavity 17 for a container 18. Bottom 15 is narrower than top 14 and sidewalls 16a and 16b are inclined relative to vertical planes.

Container 18 is an open topped tray formed by side walls 20 and 21 having end walls 22 and 23 secured between opposite ends thereof and a bottom wall 24. Support ribs 25 or other suitable projections extend upwardly from bottom wall 24 for supporting a food product 30 spaced from bottom wall 24 to provide space forming a path 28 extending between the lower surface 31 of the food product 30 and the upper surface 25a of the bottom wall 24 of container 18.

The package 10 carries the food product 30 in the open-top container 18 which is enclosed in the tubelike sleeve 12, preferably constructed of cellulosic or other poorly conductive material. The food product 30 is stored in a cabinet 170 in the container 18 inside of the sleeve covers 12. The container 18 is withdrawn from the sleeve 12 prior to heating the food product 30 and then the food 30 and container 18 are returned to the sleeve 12 to retain heat in the food until the package 10 is opened by the customer.

It should be readily apparent that refrigeration of food product 30 may not be necessary if food product 30 is not perishable or if package 10 containing the food product has been treated to assure that food product 30 has sufficient shelf life. Cabinet 170 may be refrigerated or divided into compartments, some of which are refrigerated depending upon the nature of the food product to be dispensed by the vending machine 200.

The relatively non-conducting sleeve 12 serves as a comfortable holder for the hot container 18 and food 30.

The cover for the container 18, having a lip 19 which extends around the periphery of upper edges of walls 20, 21, 22 and 23, is formed by the top 14 of sleeve 12 to provide a slip-over lid which covers the open top of the container 18 and can be removed for heating and subsequently provides insulated cool handling of the hot product 30 by enclosing the lip 19 of the container 18.

Figure 9:
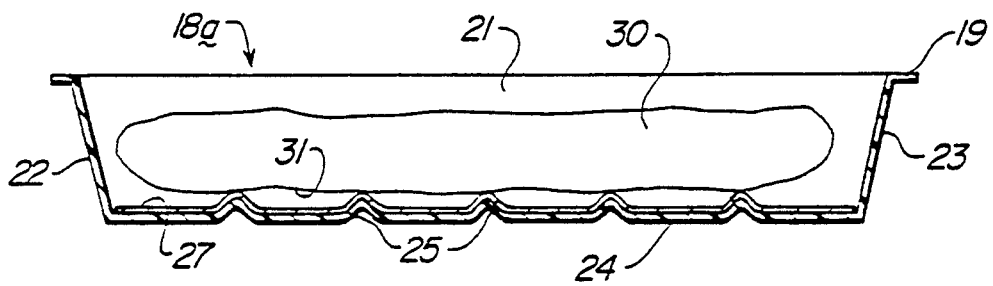
FIG. 9 is a fragmentary diagrammatic view illustrating a modified form of a food container having susceptor film mounted therein.

In FIG. 9 of the drawing, the numeral 18a generally designates a modified form of the container having a susceptor belt 27 mounted adjacent bottom 24 of the container having ribs 25 formed thereon. The susceptor belt coating 27 is formed of polyethylene terephthalate and is commercially available from a variety of sources including Frigigold of England and is recommended for use in reusable plastic or paperboard microwave cook ware in a recommended temperature range of up to 450° F. The susceptor belt 27 is rapidly heated by microwave energy until it reaches a maximum temperature of, for example, 350° F. and the temperature level is maintained to provide radiant and conductive bottom heat to the food product 30.

Figure 10:
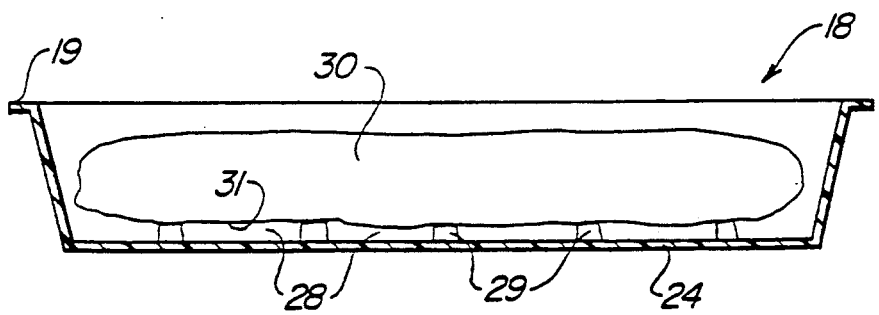
FIG. 10 is a fragmentary diagrammatic view of a food container having a bottom layer of french fried food material and an upper layer of a different food product.

In the embodiment of the container 18 illustrated in FIG. 10 of the drawing, a layer 29 of a particulate food product, such as strips of pasta or slices of potato, is positioned between the bottom wall 24 of container 18 and the lower surface 31 of food product 30. If layer 29 is slices of potato and product 30 is a meat product, juices dripping from the lower surface of food product 30 will contact and be absorbed by layer 29 of potato slices to enhance the cooking of both the slices of potato and the meat product 30. The liquid juices enhance the flavor and appearance of the potatoes while the circulation of air through passages 28 between the potato slices results in controlled drying and evaporation of moisture from the bottom of the food product 30 to provide an acceptable texture, taste, smell and appearance superior to that conventionally achieved in microwave ovens.

As illustrated in FIGS. 15-21 of the drawing, the food product 30a may comprise particulate material, such as slices of fried potatoes and a corrugated susceptor belt 27 is mounted adjacent bottom 24 to form ribs 25. Since the susceptor belt 27 is controllably heated by the microwave and portions of the upwardly extending ribs 25 contact the lower surface of the food product, the structure simulates grilling as well as allowing juices to flow into the area between the ribs.

Figure 15:
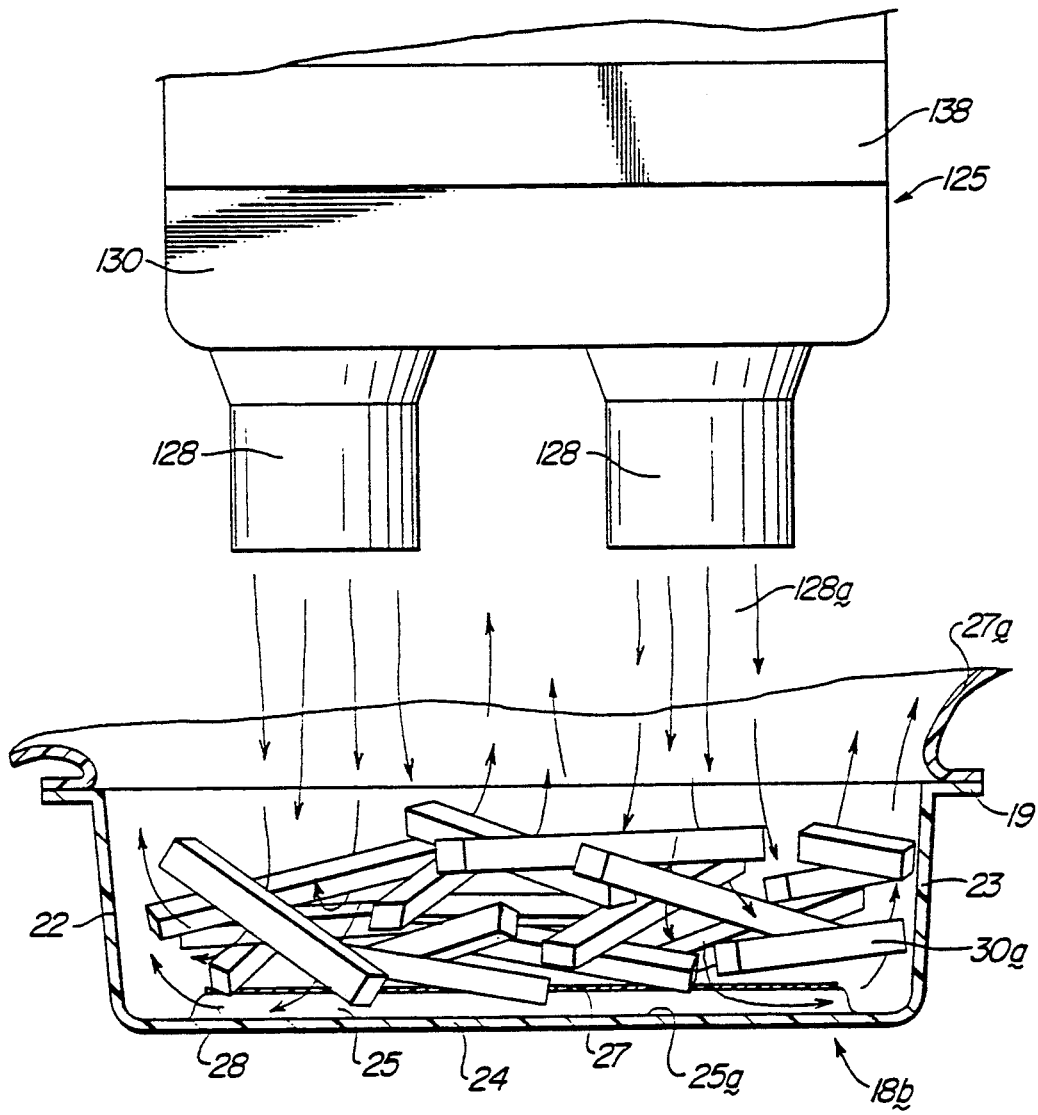
FIG. 15 is a diagrammatic view similar to FIG. 11 illustrating air flow through a particulate food product.
Figure 16:
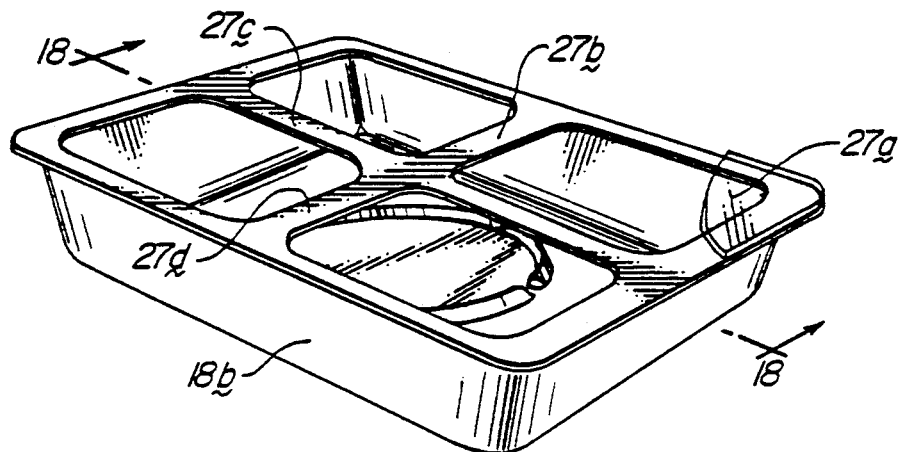
FIG. 16 is a perspective view of a container having a lattice bridging the open top thereof.
Figure 17:
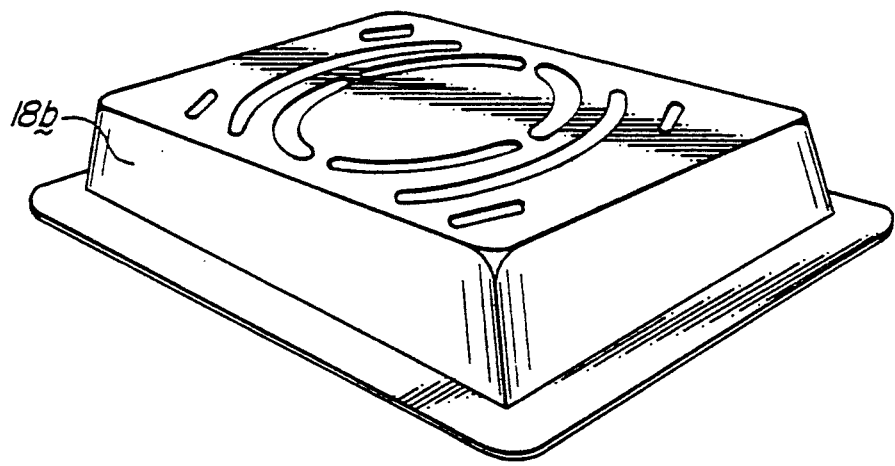
FIG. 17 is a perspective view of the bottom of the container illustrated in FIG. 16.
Figure 18:
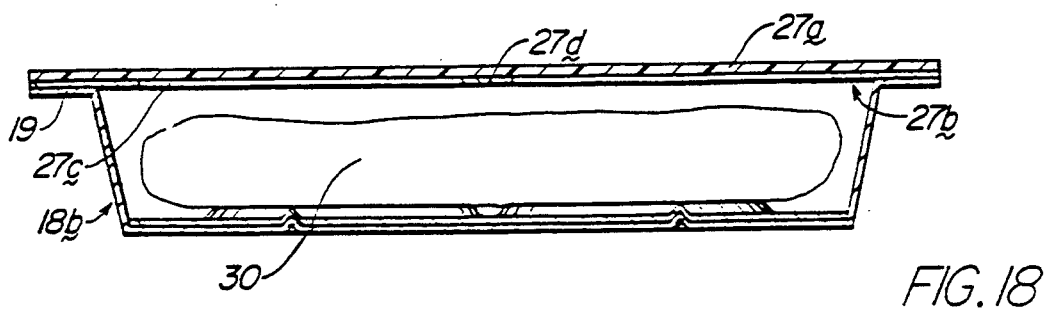
FIG. 18 is a cross-sectional view taken along line 18—18 of FIG. 16.

Container 18b, illustrated in FIG. 15, is provided with a sheet 27a of a heat shrinkable film bonded to lip 19a for sealing the food product 30a in the container 30b. A sheet 27a preferably formed of polymeric compounds and materials, for example, synthetic thermoplastic resins of the type which are commercially available from E.I. DuPont de Nemours and Co. of Wilmington, Del., used to form a polyester film which will melt when contacted by air at a temperature of less than 400° F. which results in film 27a becoming perforated and rolling toward lip 19 which extends around the periphery of container 18b. The cohesive nature of the polyester material prevents it from dripping into the food container. It should be readily apparent that the use of the polyester film 27a provides a seal which prevents deterioration of food product 30a over an extended period of time in a refrigerator or freezer.

A perforated grid or lattice 27b, illustrated in FIG. 16 and FIGS. 18-21, may be mounted between the upper surface of lip 19 and the lower surface of sheet 27a. Legs 27c and 27d spanning across the top of container 18b support film 27a to assure that portions of film 27a do not drop downwardly to engage the food product 30a in container 18b.

As diagrammatically illustrated in FIGS. 18-21 of the drawing, film 27a and lattice 27b are bonded or otherwise sealingly secured to the lip 19 which extends around the periphery of the open top of container 18b to prevent dehydration and to otherwise protect food product 30 in container 18b. Food product 30 is supported on susceptor belt 27 having upwardly extending projections 25 formed thereon for spacing the lower surface of food product 30 above the bottom of container 18b to form air passages therebetween as hereinbefore described.

Figure 19:
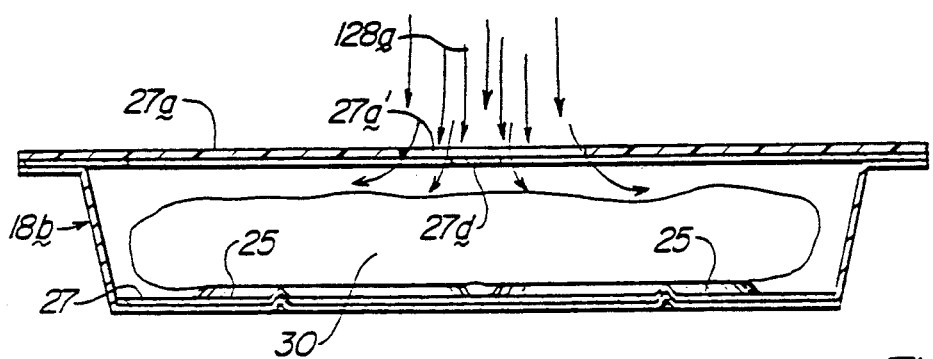
FIGS. 19–21 are cross-sectional views similar to FIG. 18 diagrammatically illustrating the progressive heating of a film sealing the container to uncover a food product in the container.

As illustrated in FIG. 19 of the drawing, impingement of air stream 28a against the upper surface of film 27a causes a central portion of film 27a to be perforated forming an opening 27a' in a central portion of the film intermediate edges of container 18b.

Figure 20:
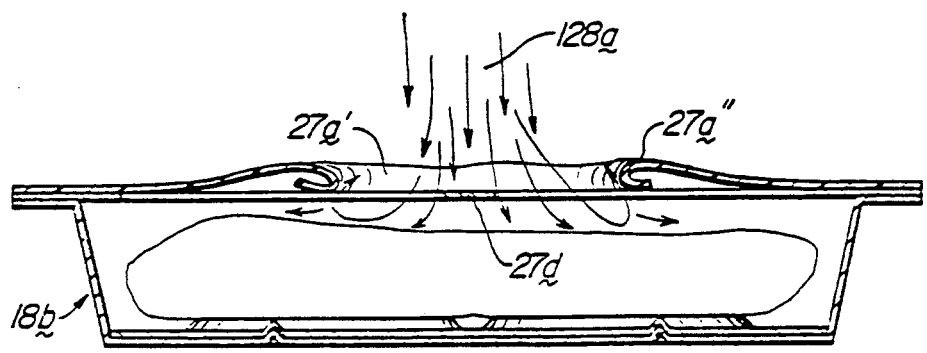

As illustrated in FIG. 20, opening 27a' is enlarged as heat is transferred to the film 27a which tends to roll back as indicated at 27a" as the film material shrinks and is distorted.

Figure 21:
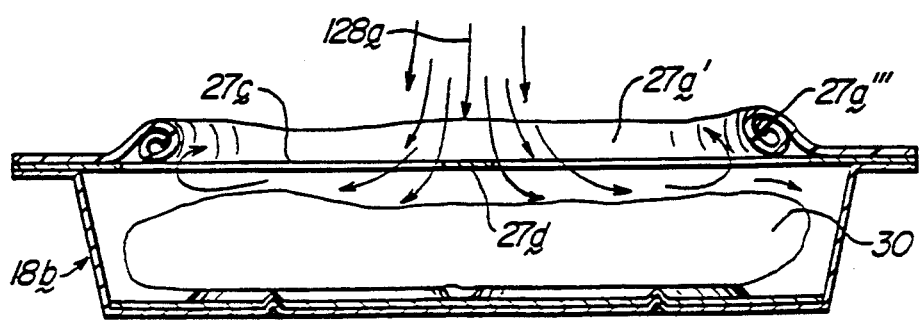

As illustrated in FIG. 21 of the drawing, heat transferred to the film 27a causes the meltable and shrinkable film 27a to retract to the position designated 27a''' thereby uncovering the upper surface of food product 30 in container 18b.

It should be appreciated that container 18b is preferably stored in a tubular sleeve 12 of the type hereinbefore described to prevent perforation of sealing film 27a during handling of containers while being transported for stocking storage cabinet 170. As will be hereinafter more fully explained, after container 18b has been moved into heat exchange relation with streams 128a of heated air projected by air circulating apparatus 100, container 18b is reinserted into the tubular sleeve 12 prior to dispensing the food product to the customer so that the hot container 18b and the food product 30 therein can be handled by the customer to eliminate the necessity for providing "hot pads" or other apparatus for handling the hot container.

Figure 1:
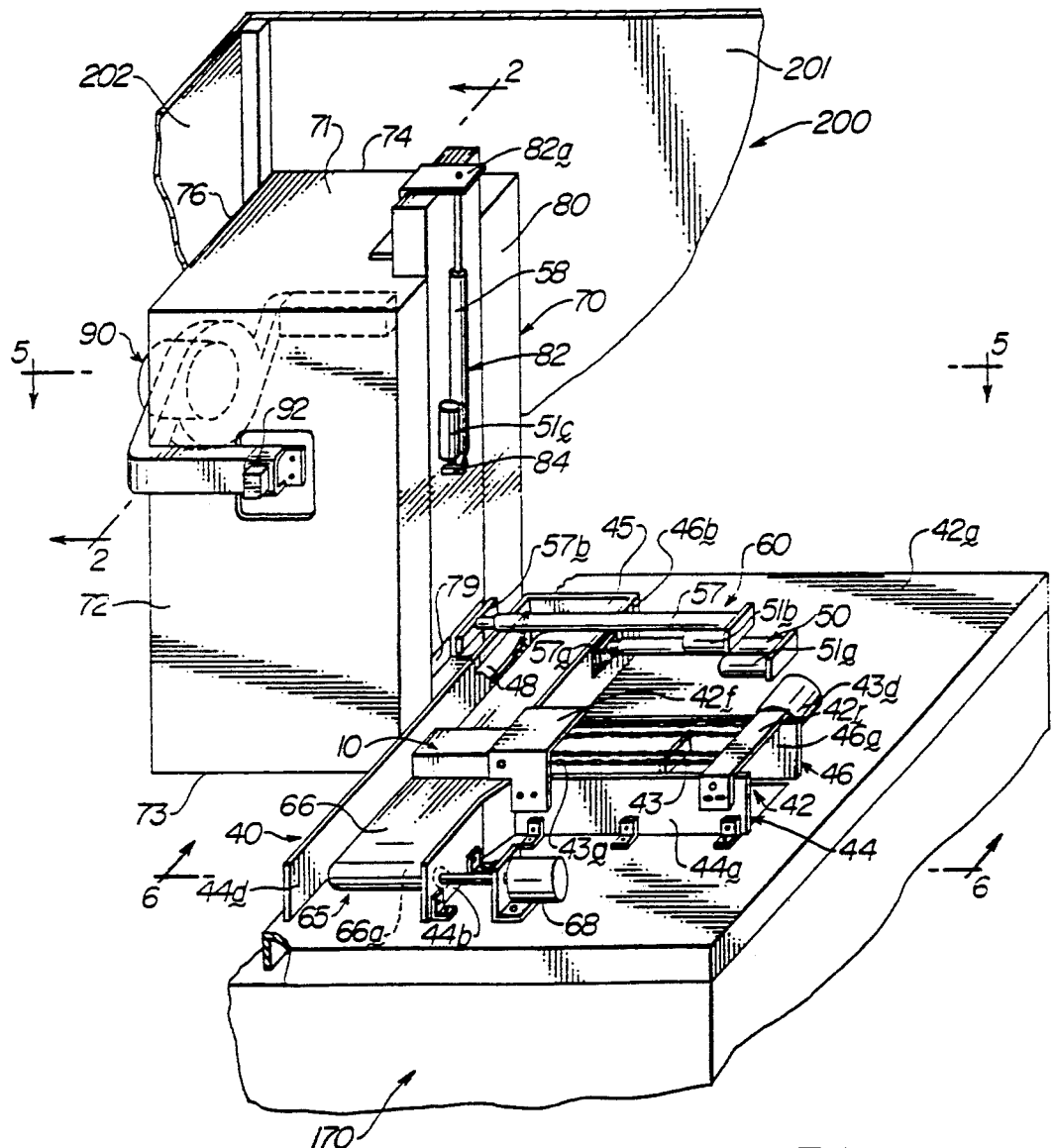
FIG. 1 is a perspective view of a package handling apparatus and oven cabinet inside a vending machine, the outer cabinet of the vending machine being broken away to more clearly illustrate details of construction.
Figure 14:
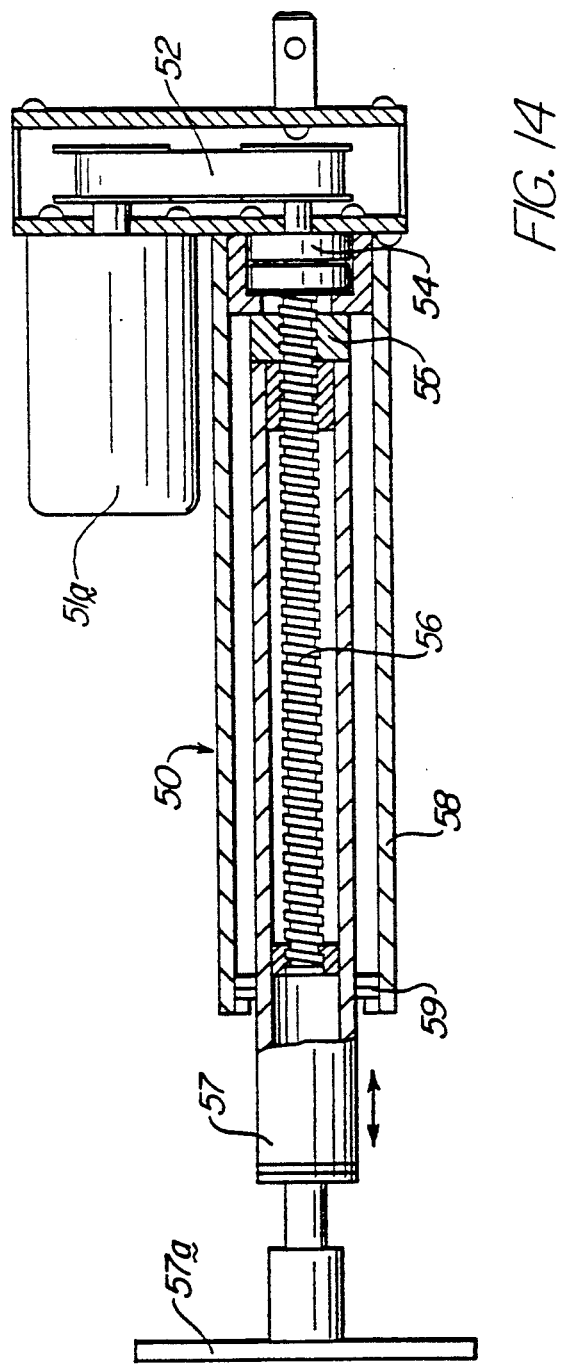
FIG. 14 is a cross sectional view taken through the electromechanical linear actuator.

As best illustrated in FIGS. 1 and 14, package handling apparatus 40 includes a container loading device 50 and a container unloading device 60. The loading device 50 and unloading device 60 are of substantially identical construction and comprise motors 51a and 51b, respectively, drivingly connected through synchronous drive belts 52 to the end of drive screws 56. Each drive screw 56 has threads formed on the outer surface thereof which engage internal threads in a drive nut 55 which moves linearly along drive screw 56 as the drive screw rotates. Thrust is transmitted from the drive nut 55 to a transitional tube 57. The entire screw 56 and nut 55 assembly is protected from contamination and environmental elements by a cover tube 58, and an end wiper seal 59. Rotational thrust bearings 54 allow the screw 56 to freely rotate under loaded conditions.

The electromechanical linear actuators 50 and 60 are commercially available from Jasta, Inc. of San Jose, Calif. and from Dayton Electric Manufacturing Co. of Chicago, Ill., and form no part of the invention except in the claimed combination.

Motors 51a and 51b are preferably variable speed reversible synchronous gear motors. It should be readily apparent that motors 51a and 51b transmit torque through belt 52 for rotating drive screws 56. Rotation of drive screw 56 causes drive nut 55 which is secured to the inner end of translating tube 57 to move translating tube 57 to extend or retract tube 57 relative to cover tube 58.

Figure 5:
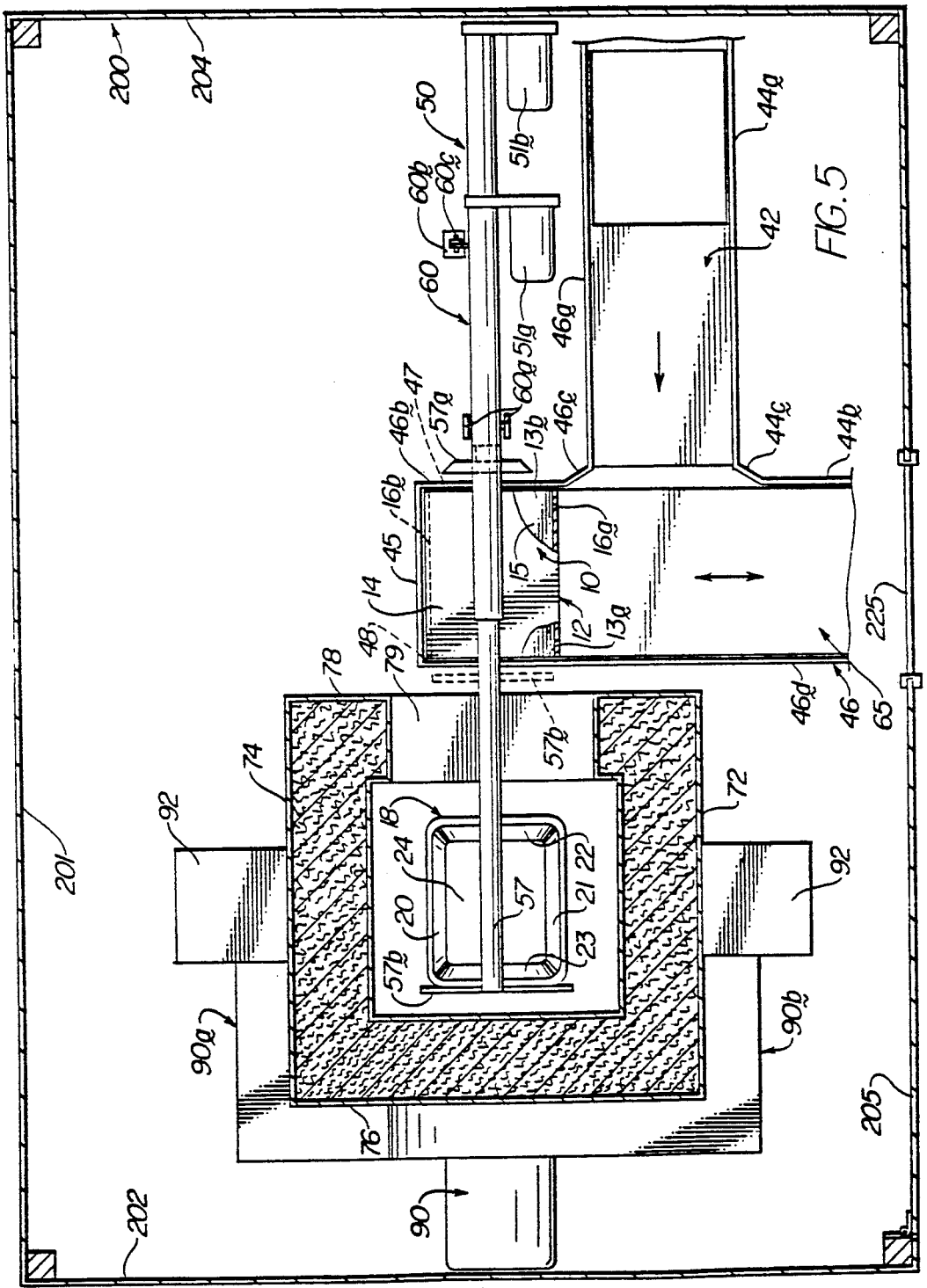
FIG. 5 is a cross-sectional view taken along line 5—5 of FIG. 1.
Figure 6:
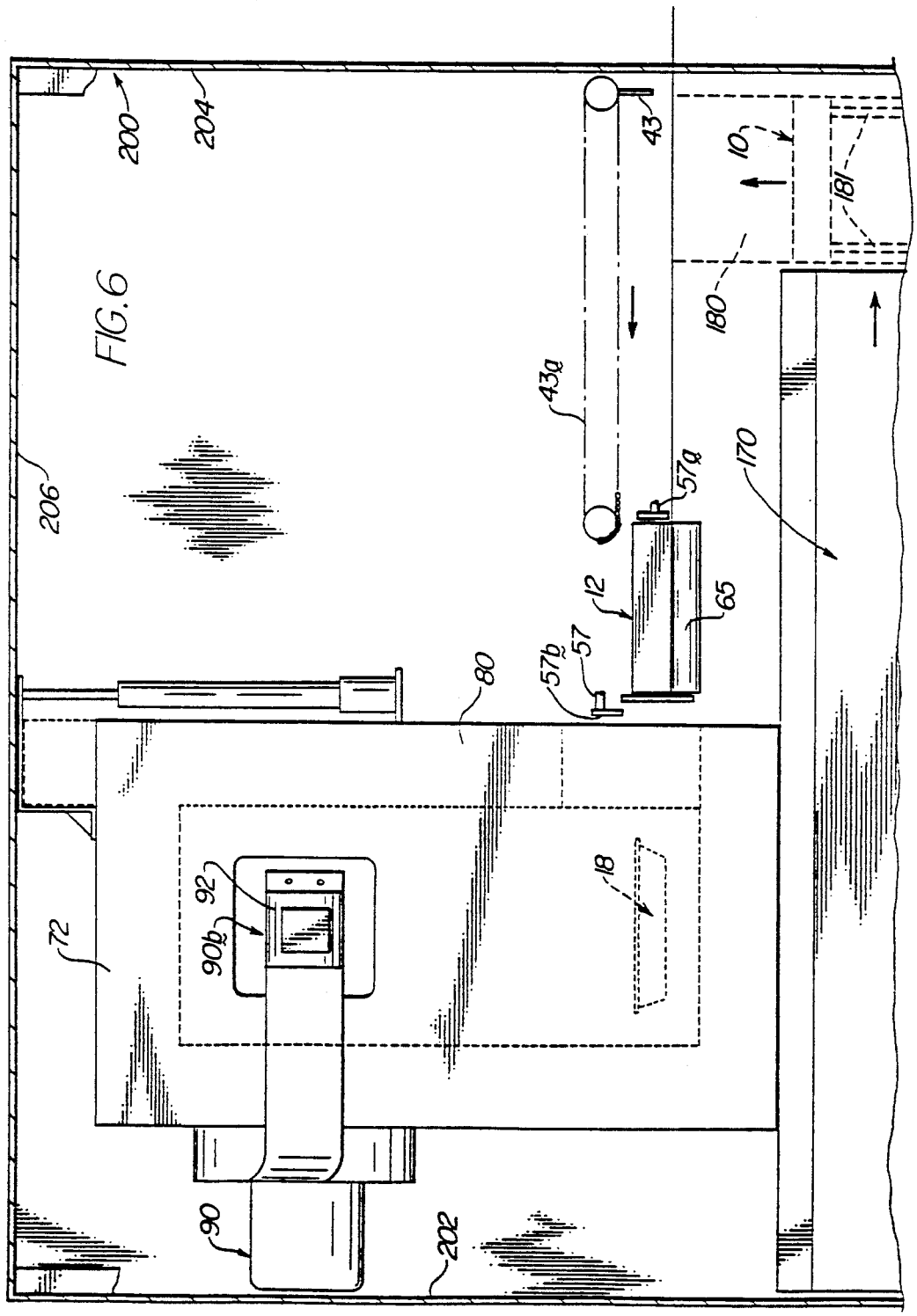
FIG. 6 is a cross-sectional view taken along line 6—6 of FIG. 1.

As diagrammatically illustrated in FIG. 5 of the drawing, electromechanical actuator 60 having rake plate 57b mounted thereon is pivotally mounted between a pair of lugs 60a and is rocked in a vertical plane by a solenoid 60b connected to an actuating arm 60c secured to cover tube 58 of actuator 60.

When rake plates 57b is in its retracted home position indicated in dashed outline at 57b in FIG. 5 of the drawing, rake plate 57b is preferably positioned at an elevation above container 19 such that when translating tube 57 is extended to the full outline position, the lower edge of rake plate 57b moves above the upper edge of container 18. When rake plate 57b reaches the full outline position illustrated in FIG. 5 of the drawing, solenoid 60b is actuated for moving rake plate 57b downwardly to an elevation below the lip extending around container 18 such that when translating tube 57 is retracted to the dashed outline position, container 18 will be returned through passage 48 in product guide member 46 and returned to the interior of tubular sleeve 12. After container 18 has been deposited in tubular sleeve 12, solenoid 60b will again be actuated for elevating rake plate 57b to a position above the upper edge of opening 48 such that pusher plate 57a may be actuated for moving the next container 18 into the oven.

Conveyor 65 includes a flexible belt 66 extending around a drive roller 66a and a driven roller 66b, drive roller 66a being driven by a reversible variable speed motor 68.

The in-feed conveyor, generally designated by the numeral 42, comprises a paddle 43 suspended between chains 43a and 43b which extend around drive sprockets mounted on a shaft driven by a motor 43d. The in-feed conveyor 42 is mounted between guide members 44 and 46. As illustrated in FIG. 5, guide member 44 comprises a generally L-shaped member formed by substantially perpendicularly disposed legs 44a and 44b connected by a transition section 44c. Product guide member 44 is connected to a second product guide member 46 by a front bracket 42f and a rear bracket 42r. As illustrated in FIG. 1 of the drawing, an in-feed drive motor 43d is secured to guide member 46 and paddle 43 is moved between guide members 44 and 46 by chains 43a and 43b.

Product guide member 46, best illustrated in FIG. 5, is formed by generally perpendicularly disposed legs 46a and 46b connected by a transition section 46c. A third leg 46d extends generally parallel to leg 46b and has an end secured to an end of leg 46b by stop member 45. As will be hereinafter more fully explained, stop member 45 functions as a stop to limit movement of package 10.

Leg 46b of product guide member 46 has a first passage 47 formed therein while section 44d has a second passage 48 formed therein. As will be hereinafter more fully explained, when conveyor 65 moves package 10 into engagement with backstop 45, the open end 13a of tubular sleeve 12 is positioned adjacent opening 47 while the open end 13b of sleeve 20 is positioned adjacent passage 48. When motor 51a of the linear actuator of loader assembly 50 is energized, tube 57 and push plate 57a on the end thereof will move through passage 47 and through the open end 13b of sleeve 12 for moving container 18 through the open end 13a of sleeve 12 and through passage 48 into a cooking chamber in oven 70. After container 18 is positioned in the cooking chamber, motor 51a is reversed, thereby retracting translating tube 57 and push plate 57a to the position illustrated in FIG. 1 of the drawing.

After the product 30 in container 18 has been heated, motor 51b of the linear actuator of the unloading assembly 60 will be energized to extend the translating tube 57 of the unloading assembly 60 causing the rake plate 57b to move into the cooking compartment above container 18 and then pivot downwardly for engaging lip 19 on end wall 21 on container 18. Motor 51b is then reversed for retracting tube 57 and rake plate 57b for urging container 18 out of the oven 70, through passage 48 and through the open end 13a of sleeve 12. When motor 68 is energized, the heated food product 30 in container 18 which has been repositioned in sleeve 12 will be moved toward the delivery end of conveyor 65.

Product guide members 44 and 46 are bolted or otherwise secured to the upper surface of loader base member 42a upon which in-feed conveyor 42 and delivery conveyor 65 are mounted.

The oven 70 comprises spaced side walls 72 and 74, a back wall 76 and a front wall 78. Front wall 78 has an access opening 79 formed therein which is opened or closed by a door 80. A microwave trap 81 is formed around door 80 and is configured to prevent passage of microwave energy through space between the periphery of the door 80 and walls of the cabinet 70. Top wall 71 and bottom wall 73 close upper and lower ends of oven 70. Each wall of the oven is preferably formed by spaced metallic sheets and the space between the sheets is filled with thermal insulation material.

An actuator 82, secured to mounting bracket 82a, is connected through a link 84 to door 80 for moving door 80 vertically relative to access opening 79. Actuator 82 is preferably an electromechanical actuator of the type illustrated in FIG. 14 and is driven by a motor 51a.

Figure 2:
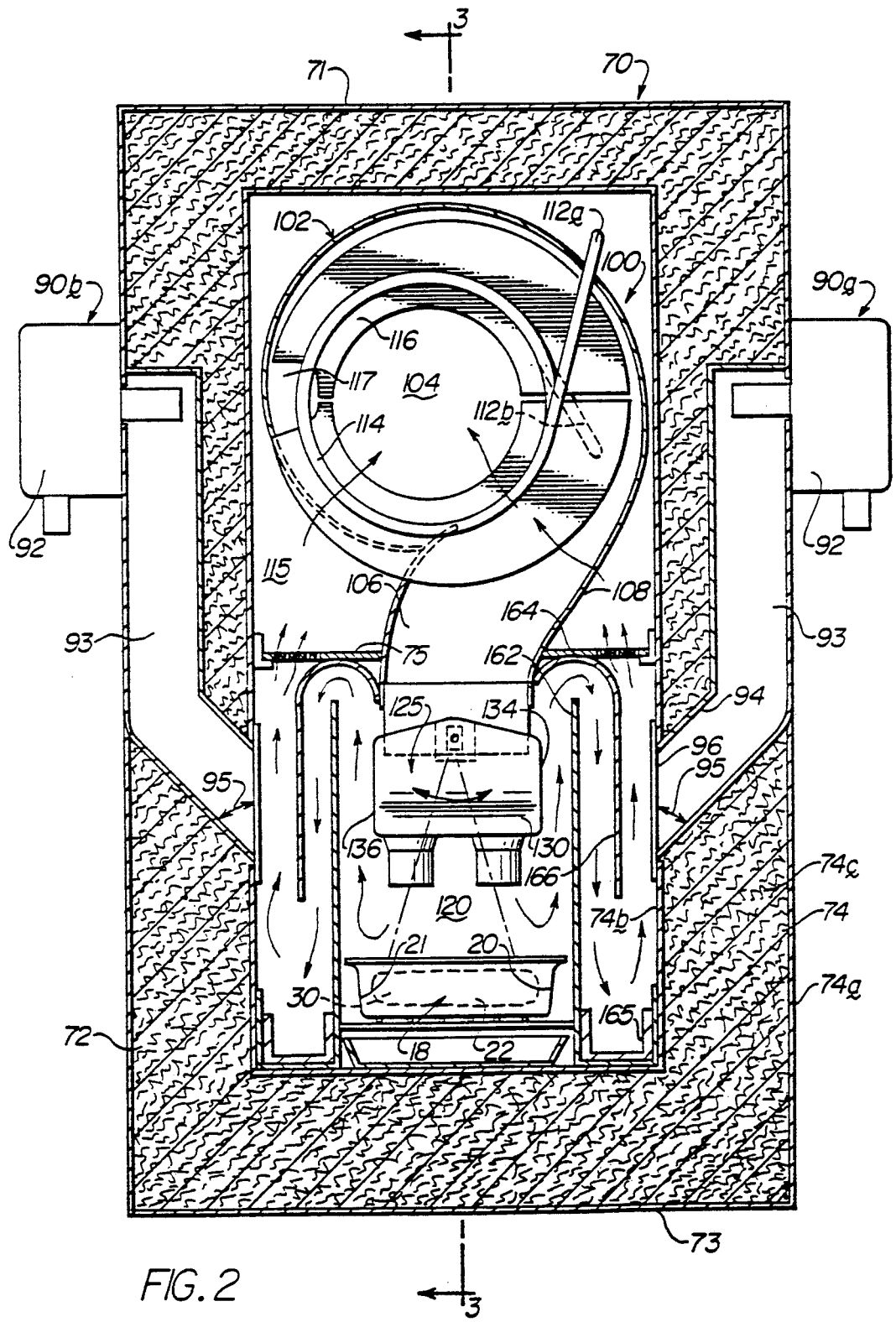
FIG. 2 is a cross-sectional view taken along line 2—2 of FIG. 1.

Referring to FIGS. 1 and 2 of the drawing, electromagnetic radiation device generally designated by the numeral 90 in the illustrated embodiment comprise a pair of magnetrons 92 connected to wave guides 93 formed in side walls 72 and 74 of oven 70. The magnetrons 92 supply electromagnetic energy to wave guides which carry the energy to the cooking chamber. A preferred microwave frequency is 2450 megahertz. Magnetrons 92 are conventional vacuum tubes in the microwave oven that convert electrical energy to electro magnetic energy in the microwave frequency spectrum. Waves of microwave energy are similar to radio waves except they are higher frequency than radio waves lower frequency than ordinary light waves. The microwave energy is channeled through wave guides 93 from the magnetrons 92 into the cooking chamber 120.

As illustrated in FIG. 2 of the drawing, the side walls 72 and 74 are formed by spaced sheets 74a and 74b and insulation material 74c is configured to form a guide tube 93 having a lower end 94 which is inclined at an angle 95 relative to a vertical plane 96 at an angle in a range between 15° and 75°. In the illustrated embodiment, the angle 95 is approximately 45°.

The application of microwave radiant heating is delivered from two sides and angles downwardly toward food 30 in an open top container 18. Since the container and the food in the container do not reflect microwave significantly and since the space under the container diffuses microwave which passes through or by the container the beam from one wave guide is not reflected directly into the other but is largely retained in the heating chamber.

Since the container 18 is non-metallic reflections from one wave guide 93 are not reflected into the other to keep microwave in the chamber 120 to effectively heat the food 30.

The support for the open package is preferably less than 25% reflective of the microwave.

The reflective surface of the bottom 24 of the container 18 is greater than one-fourth wave length, for 2450 megahertz (MHZ) microwave one-fourth of 13 cm, below the surface of food being heating. The angle and the distance reduce standing waves in the small heating cavity.

A tube 103 is connected through a valve 103a to a supply of water or steam and which may be used for delivering an atomized spray of water or steam into the air conditioning chamber 115 for controlling the relative humidity and dew point of air circulated through air conditioning chamber 115 and cooking chamber 120.

Figure 3:
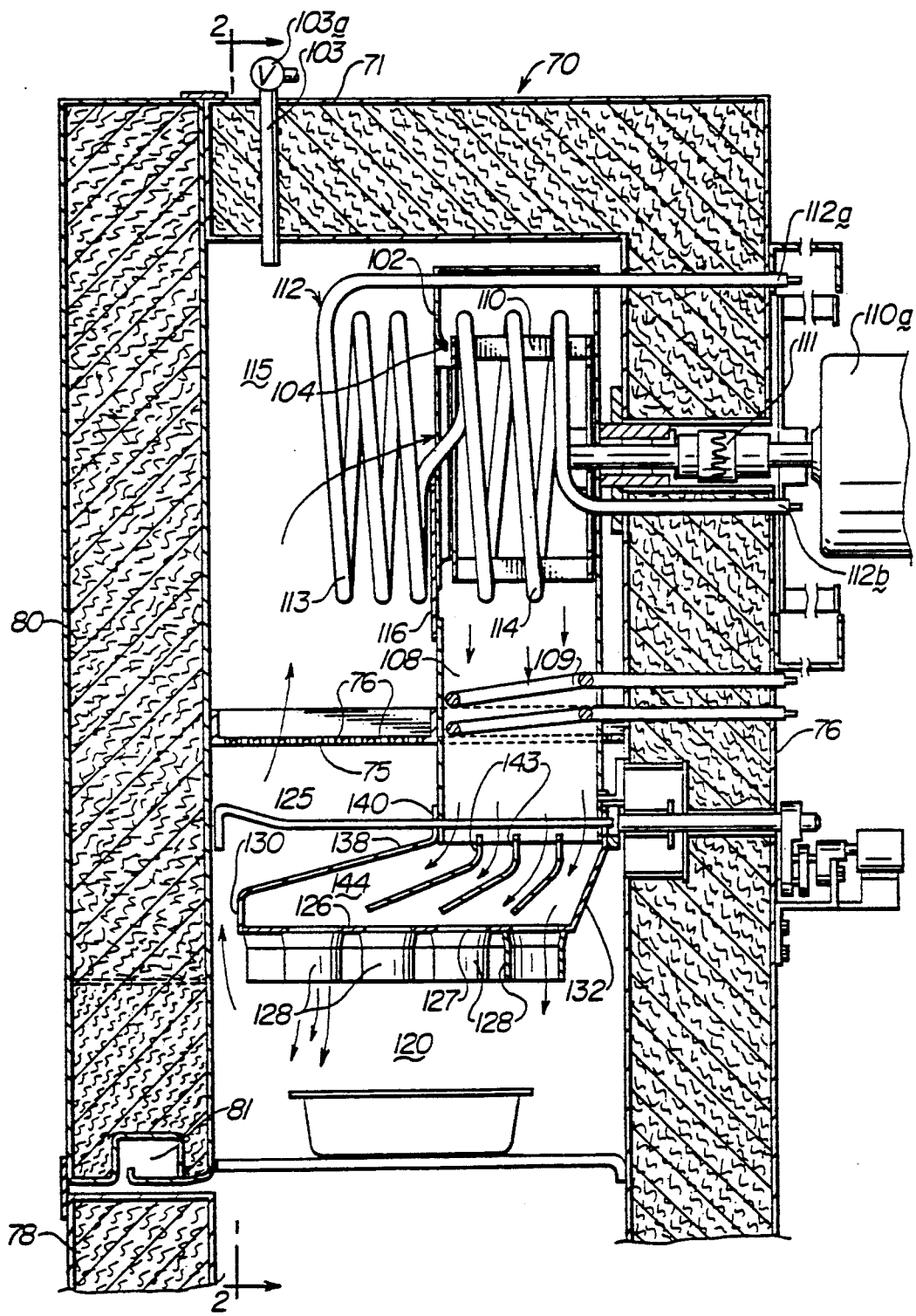
FIG. 3 is a cross-sectional view taken along line 3—3 of FIG. 2.
Figure 4:
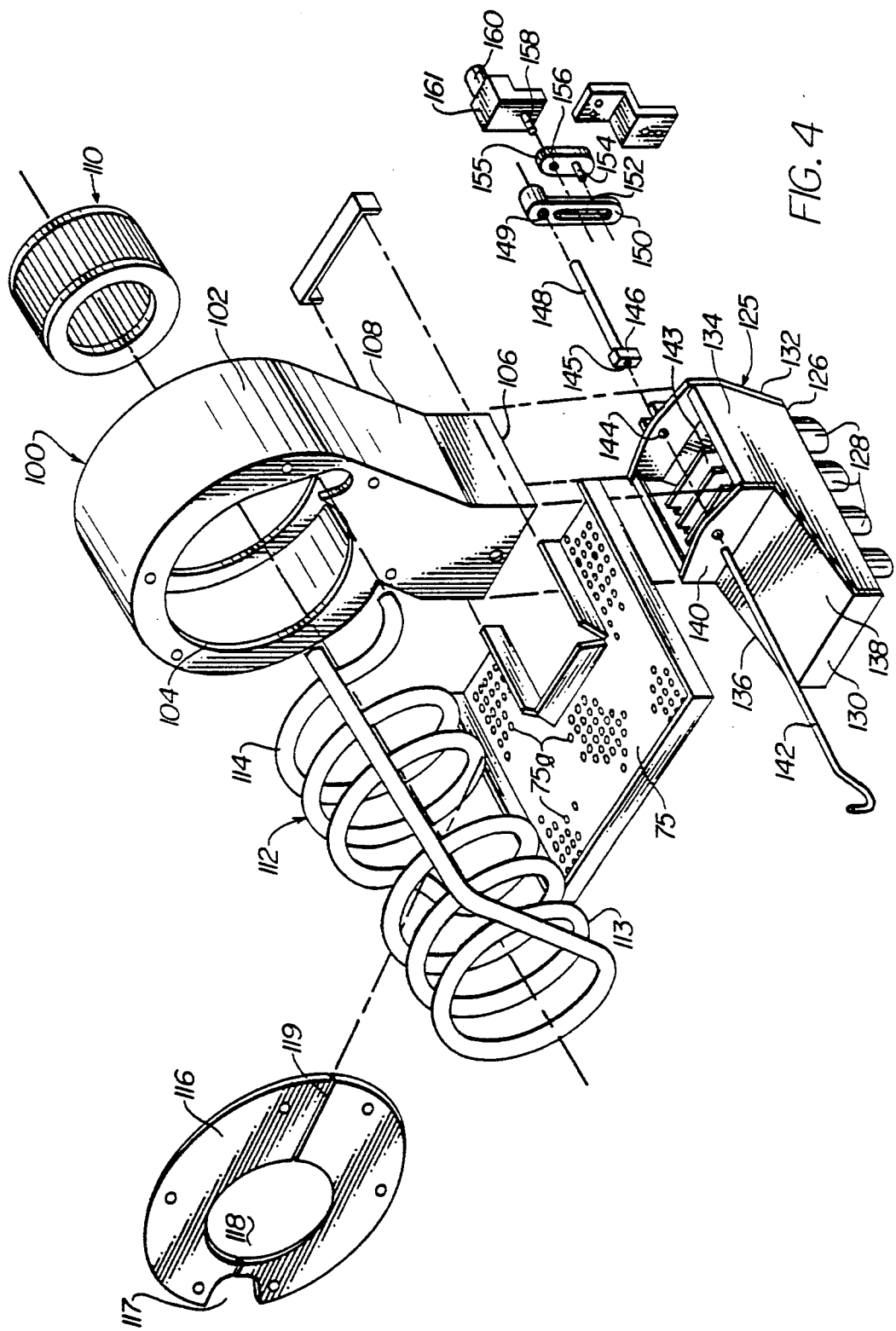
FIG. 4 is an exploded perspective view of the air dispensing apparatus.

Referring to FIGS. 2, 3 and 4 of the drawing, air circulating apparatus generally designated by the numeral 100 comprises a blower housing 102 having an inlet opening 104 and a discharge opening 106. As illustrated in FIGS. 2 and 4, blower housing 102 is in the form of a volute and a plenum section 108 is formed adjacent the discharge opening 106.

A radial flow fan impeller 110 draws air axially through inlet opening 104 and discharges air radially through plenum section 108 and discharge opening 106.

A heating element 112 having coils 113 of a first stage and coils 114 of a second stage is mounted for heating air drawn into the blower housing 102.

As best illustrated in FIG. 3 of the drawing, the interior of the cabinet 70 is divided by a perforated plate 75 to form an air conditioning chamber 115 and a cooking chamber 120. Perforated plate 75 is constructed of a metallic material and has perforations 76 with relatively small openings equivalent to more than 50% of the surface area. The perforated metal sheet 75 prevents microwave energy from passing into the air conditioning chamber 115.

As best illustrated in FIG. 3 of the drawing, the first stage of coils 113 is mounted in air conditioning chamber 115 outside of the blower housing 102 while the second stage 114 of coils is mounted inside blower housing 102. Terminals 112a and 112b of heating element 112 are connectable to a suitable source of electricity.

As illustrated in FIG. 4 of the drawing, a mounting plate 116 having a notch 117 formed in the periphery thereof and a central opening 118 is bolted or otherwise secured to blower housing 102 for supporting heating element 112. Plate 116 is formed in two parts which are connectable along a part line 119.

As illustrated in FIG. 3, blower 110 is mounted on a shaft which is driven through a coupling 111 by a motor 110a.

Coils 109 of a third stage heating element 109 is mounted in the plenum section 108 of blower housing 102 and positioned such that air delivered radially from blower 110 is heated immediately prior to being delivered through discharge opening 106. It should be readily apparent that only coils 109 may be activated while coils 113 and 114 are idle, if it is deemed expedient to do so depending upon the heating requirements of a particular food product.

An air dispensing duct generally designated by the numeral 125 is secured to plenum 108 for receiving air from discharge opening 106.

As best illustrated in FIGS. 3 and 4 of the drawing, air dispensing apparatus 125 comprises a tapered duct formed by a perforated plate 126 having an array of passages formed therein which communicate with tubes 128. A front wall 130 and a rear wall 132 extend upwardly from the perforated plate 126 and are connected between side walls 134 and 136. An inclined top wall 138 extends between front wall 130 and a flange 140 encircling the lower end of duct 108 and enclosing the discharge opening 106 from the blower housing 102.

As illustrated in FIG. 3 of the drawing, air directing vanes 142 extend between side walls 134 and 136 of the tapered duct for distributing air along the length of the interior 144 of the tapered duct.

The air dispensing apparatus 125 is pivotally secured to duct 108 by a pivot pin 142 extending through aligned apertures 144 in flange 140. Pivot pin 142 extends into an opening 145 formed in lug 146 on shaft 148 which extends into an aperture 149 on a link 150. Link 150 has an elongated slot 152 formed therein into which a pin 154 on crank 155 extends.

Crank arm 155 has an aperture which receives a drive shaft 158 driven by motor 160 through a gear reducer 161.

A radial blower 110 discharging its highest velocity air from the outer portion of the volute downwardly through shaped openings in tubes 128 to impinge upon a narrow food product 30 in the open top container 18.

Figure 11:
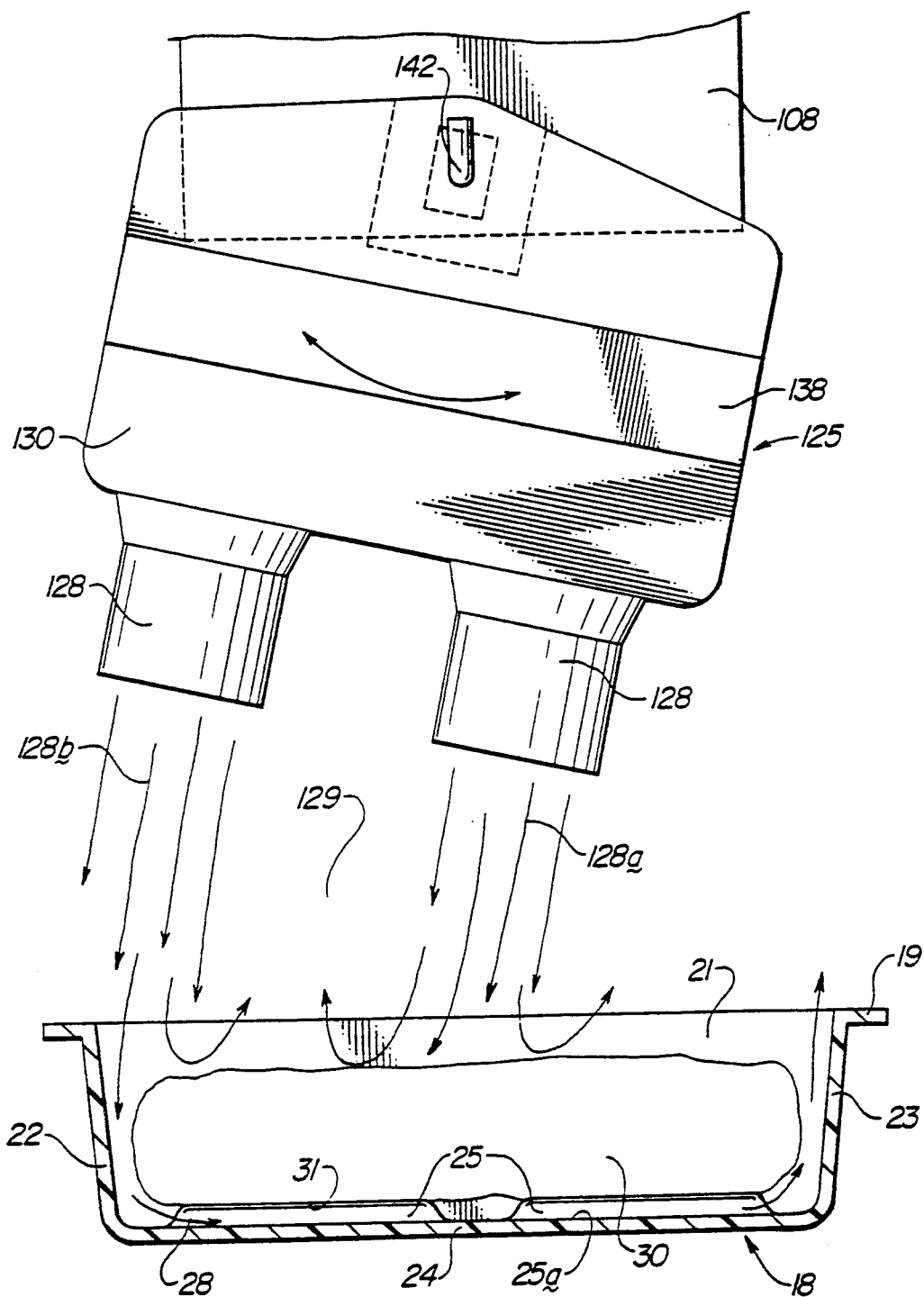
FIG. 11 is a diagrammatic view illustrating air flow during a first stage of the cooking process.
Figure 12:
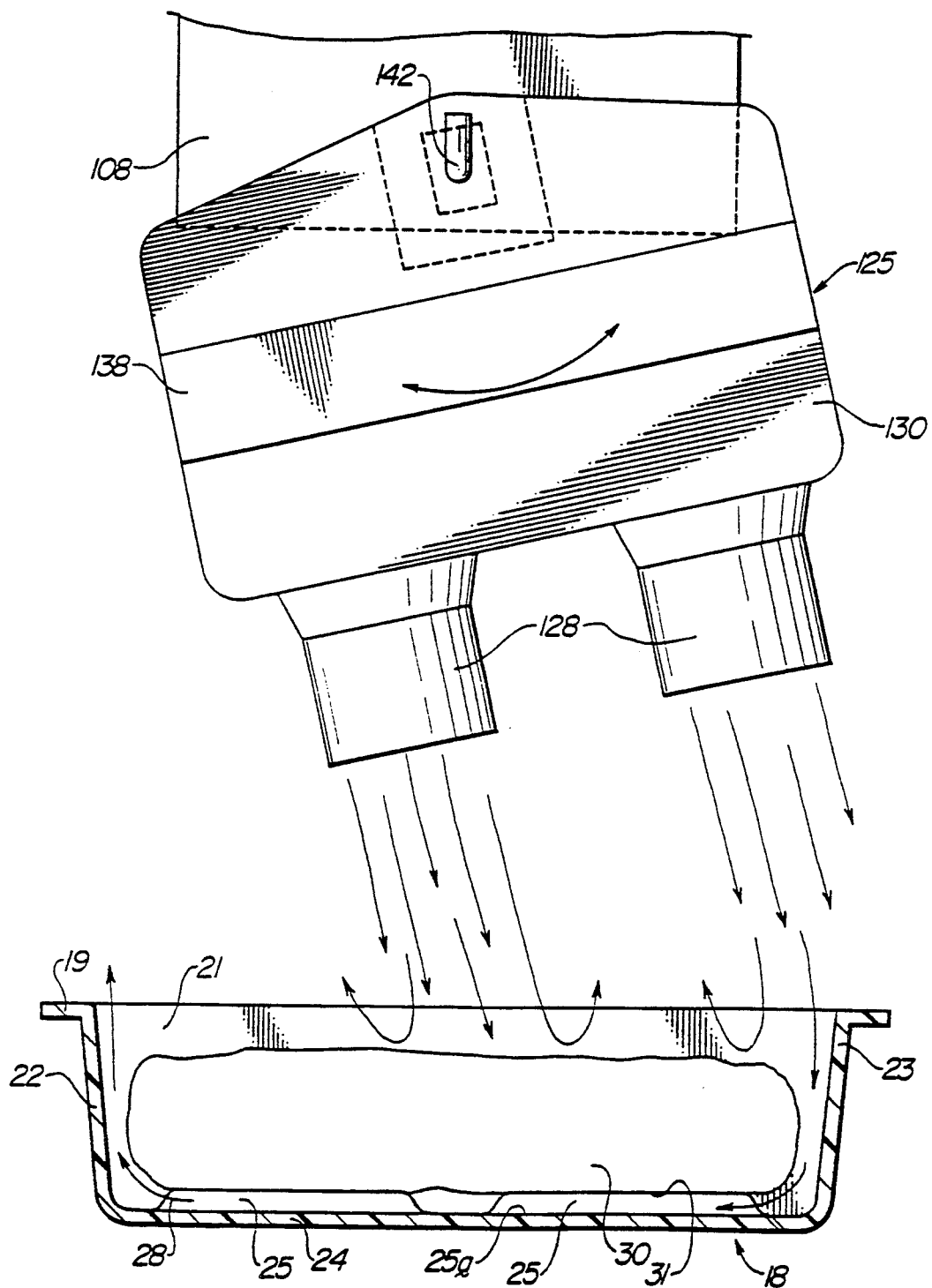
FIG. 12 is a diagrammatic view similar to FIG. 11 illustrating air flow during a second stage of the cooking process.

The air dispensing duct 125 is moved relative to the product 30 to give uniform coverage by the air streams. As best illustrated in FIGS. 11 and 12, the sides 22 and 23 of the container 18 cause a portion of the air stream to be deflected to heat the sides and bottom 31 of product 30 in the container. The movement applies the air streams near one side of the container adjacent side wall 22 and then to the other side adjacent side wall 23 so that parts of the air streams are alternately applied to opposite exposed sides of the product 30 and are caused to alternate the lateral flow through loose stacks of food products 30 such as curled or random lengths of french fried potatoes. This alternating lateral air flow through paths 28 between support ribs 25 passes under and heats the lower side 31 of irregularly shaped products such as bone-in chicken parts.

The effectiveness of the sideways air heating of lower surfaces 31 can be enhanced by ribs 25 to provide air passages under flat products.

Further, the moving air dispensing apparatus 125 provides moving reflective surfaces which serve as stirrers to help distribute the microwave energy in the cooking chamber 120.

The combination of extended orifices through tubes 128, and the open top container 18 provides air escape path 129 while bringing the orifice to an optimum distance from the product 30. It should be noted that upper edges of the sides 20 and 21 and ends 22 and 23 of container 18 extend above the height of the contained product 30 to enhance air flow between the lower surface 31 of the product 30 and the bottom 24 of container 18.

As illustrated in FIG. 2 of the drawing, streams of air dispensed from air dispensing duct 125 through hollow air dispensing tubes 128 impinge upon the upper surface of a food product 30 in container 18. The spent air travels through space 129 between tubes 128, as illustrated in FIGS. 11 and 12 of the drawing. Spent air travels upwardly adjacent baffles 162 and is then directed downwardly by a curved surface 164 along a path between baffle 162 and baffle 166 downwardly toward soil collector pans 165. Soil collector pans 165 are preferably removably mounted and are maintained at a temperature which is less than the temperature of any other surface in the oven 70 for causing very fine smoke-type particles in the moving air to be collected on the coldest surface in the recirculating path. From soil pans 165 the recirculating air is directed upwardly between the outer surface of baffle 166 and sheet 74b of side wall 74 upwardly through passages formed in the perforated plate 75.

Baffles 162 and 166 are preferably constructed of material which is relatively transparent to microwave energy. To assure that the soil collection pans 165 are maintained cooler than other surfaces in oven 70, the pans may be exposed to outside air or water cooling to facilitate collecting aerosol from the recirculating air.

From the foregoing it should be readily apparent that the disclosed method for controlling the temperature and surface texture of a food product which is to be delivered from vending machine 200 generally comprises delivery of a suitably packaged and preserved food product from a storage compartment 170 to an oven 70. The package 10 is positioned by back stop member 45 in a predetermined relationship relative to electromechanical linear actuators 50 and 60 and relative to access opening 79 communicating with cooking chamber 120 in oven 70.

Actuation of the actuator of the loading device 50 results in movement of push plate 57a through tubular sleeve 12 for pushing container 18 out of sleeve 12 and into the cooking chamber 120. Streams 28a of air delivered through tubes 128 of the air circulating apparatus 100 melts and shrinks film 27a for uncovering food product 30 in the open top container 18.

In the embodiment illustrated in FIG. 15 of the drawing, one or more air streams 128a, after causing the food product 30a in container 18 to be uncovered will be delivered through the open top of container 18b. If the food product 30a in the container is strips or slices of pasta, potatoes or other particulate material, air from stream 128a will be delivered through the stacked material in heat transfer relation with the surface of the pieces of the food product.

If food product 30 is a solid article as designated by the numeral 30 in FIGS. 11 and 12 of the drawing, air dispensing duct 125 is preferably rocked causing air streams 128a and 128b to move across the surface of the food product between lateral edges thereof such that regions of controlled air pressure are alternately formed adjacent opposite sides of the product 30 such that temperature controlled air flows through passage 28 between the lower surface 31 of the food product and the upper surface 25a of the bottom 24 of container 18.

After the surface of the food product 30 has been heated by air streams 128a and 128b, the recirculating air tends to limit localized heating of the product by microwave energy delivered by magnetrons 92. Tips, and thin areas of the product which are rapidly heated by the microwave energy may actually dissipate heat to air in streams 128a and 128b to provide cooling to certain portions of the food product.

After the food product 30 in container 18 has been sufficiently heated, air flow through the air circulating apparatus 100 is terminated, magnetrons 92 are turned off and blower actuator 82 is energized for moving the door upwardly to the position illustrated in FIG. 1 of the drawing. The electromechanical actuator of the container unloading device 60 is then actuated for moving rake plate 57b from the dashed outline position in FIG. 5 of the drawing to the full outline position. Rake plate 57b is then lowered and retracted for moving container 18 out of the oven and redepositing the hot container and the food therein in the tubular sleeve 12.

After the heated food product and container 18 have been moved into the protective tubular sleeve 12, conveyor 65 is energized for moving the heated food product toward the delivery passage 124 of the vending machine 200 such that the product is accessible to the customer by opening protective door 225.

We claim:

1. A microwave oven comprising: a cabinet having an interior; means dividing the interior of the cabinet into a cooking chamber, a conditioning chamber and a food storage chamber; means to open a food product container, for moving said food product container from said food storage chamber to said cooking chamber; and means adapted to move said food product container out of said cooking chamber and to close said food product container after being removed from said cooking chamber circulating means in said conditioning chamber to recirculate air from the conditioning chamber through said cooking chamber; air dispensing means operably connected to said circulating means, said dispensing means being adapted to project a stream of air into said cooking chamber; means movably supporting said air dispensing means to change the direction in which said air stream is projected into said cooking chamber; and microwave heating means communicating with said cooking chamber.

2. A microwave oven according to claim 1, with the addition of: product handling means associated with said cabinet, said product handling means being adapted to move products into and out of said cooking chamber.

3. A microwave oven according to claim 2, said product handling means comprising: pusher means adapted to move a product into said cabinet; and means adapted to move a product out of said cooking chamber.

4. A microwave oven according to claim 1, said oven being adapted to cook a food product having a surface, and with the addition of means communicating with said circulating means and said cooking chamber adapted to deposit moisture onto the surface of a food product in the cooking chamber when the surface of the food product is less than a predetermined temperature and to evaporate moisture from discrete areas on the surface of the food product when the surface of the food product exceeds said predetermined temperature.

5. An oven comprising: a cabinet forming a cooking chamber; a container having a bottom wall and side walls; a food product having an upper surface and a lower surface; support means on said bottom wall adapted to support said food product such that said lower surface dispensing means in said cabinet is spaced from said bottom wall; air dispensing means in said cabinet adapted to direct a stream of air toward said upper surface of said food product in said container; and means for moving said air dispensing means relative to said container such that said stream of air is directed so that air flow is induced between the lower surface of said food product and the bottom wall of said container; said stream of air having a cross sectional area which is less than the total area of the surface of said food product in said container.

6. An oven according to claim 5, with the addition of microwave heating means communicating with said cooking chamber, at least a portion of said container being formed of material which is heated by microwave heating energy, such material being heated by the microwave heating energy to heat the bottom surface of the food product where it contacts the container.

7. An oven according to claim 5, said container being metallic and conductive to transmit heat from sides of the container to the lower surface of the food product to assist heating the food product.

8. An oven according to claim 5, said circulating means comprising: means forming spaced orifices adapted to dispense a plurality of streams toward said container.

9. An oven according to claim 5, with the addition of means radiating microwave energy into said cooking chamber through a wave guide inclined at an angle between 15° and 75° from a plane extending perpendicular to the bottom wall of the container.

10. An oven according to claim 9, said container being formed of material which absorbs microwave energy.

11. An oven according to claim 16 further comprising: a blower housing having intake and outlet openings communicating with said cooking chamber; blower means in said blower housing adapted to circulate temperature controlled air from said inlet opening to said outlet opening; air return means communicating with said inlet opening; collector means in said air return means; and means maintaining said collector means at a temperature less than the temperature of circulating air to collect airborne particles.

12. An oven according to claim 11, with the addition of: air dispensing means communicating with said outlet opening; and means to direct said stream of air comprising means pivotally securing said dispensing means relative to said blower housing for oscillating movement.

13. Heated food vending apparatus means comprising: a container; a food product in said container; a cover on said container; means to remove said cover of said container; means to heat the food by application of streams of air projected toward the food product; and means to cover the food and container after heating.

14. The apparatus of claim 13 with the addition of: microwave heating means to heat the food product.

15. The apparatus of claim 13, said container comprising: an open top tray and said cover comprising a sleeve having a top to cover the tray.

16. The apparatus of claim 13, said cover on said container comprising a meltable film formulated to be deformed to uncover the food in said container when hot air projected toward the food product is applied to the meltable film.

17. The apparatus of claim 13, said means to heat food by application of streams of air comprising dispensing means forming a plurality of spaced streams of heated air; said container having sides higher than the food product in said container, said streams of heated air contacting the food product and then spreading toward the sides of the container.

18. The apparatus of claim 13, said food product comprising: a porous heap of largely spaced apart layers of food segments in which the air applied penetrates the heap of food segments to heat lower layers of food product and then the air travels to the sides of the container to escape.

19. Vending apparatus for a heated product comprising: a heating chamber; a product in an open top container; sleeve cover around said container; means to push said container out of said sleeve cover into said heating chamber to heat the product; and means to return the container from said heating chamber to said sleeve cover.

20. The apparatus of claim 19, with the addition of means to augment surface heating of the product by application of microwave energy.

21. The apparatus of claim 19, said heating chamber comprising: an oven; and means in said oven to apply recirculating hot air to the product and the container.

22. The apparatus of claim 21, the circulating air is directed at the product in the container and is caused to apply pressure on the product near one side of the container.

23. The apparatus of claim 22, said means in said oven to apply recirculating hot air being configured such that the air directed toward the food product in the container is alternately directed against one side and then another of the product and the container.

24. The apparatus of claim 23, with the addition of means in said container to space a portion of the product away from the bottom of the container so that as air intensity alternates from side to side the air passes under the product.

25. The apparatus of claim 22 in which the bottom of the container has ribs or projections which provide air passages under the product.

26. The apparatus of claim 22 in which small pieces of a different food product are placed under larger pieces to space the larger pieces away from the bottom of the container.

27. An apparatus to dispense a heated food product in a covered container comprising: an oven having a heating chamber; means to uncover the food product in the container; means to move the container and the food product to be heated into said heating chamber; means to move the product out of the heating chamber; and means to cover the food product in the container.

28. The apparatus of claim 27, with the addition of hollow sleeve means; and an open top container slidably disposed in said hollow sleeve means.

29. An apparatus to dispense a heated food product in a closed open container comprising: an oven having a heating chamber; first plunger means to open the container and move the food product to be heated in the open container into said heating chamber; and second plunger means adapted to move the open container and the product out of the heating chamber and to close the container after removing the container from the heating chamber.

30. The apparatus of claim 27, with the addition of: means in said oven forming a region of controlled air pressure alternately adjacent opposite sides of the product such that temperature controlled air flows between the lower surface of the product and the bottom of the container.

31. The apparatus of claim 30 with the addition of: means applying microwave energy to the product to heat the product, said means in said oven forming a region of controlled air pressure forming a stream of the temperature controlled air directed to limit localized heating of the product by the microwave energy.

32. The apparatus of claim 30, said means in said oven forming a region of controlled air pressure alternately adjacent opposite sides of the product comprising: means forming spaced regions of subatmospheric pressure alternately adjacent opposite sides of the product.

33. The apparatus of claim 32, said means forming spaced regions of subatmospheric pressure comprising: means directing air to flow alternately adjacent opposite sides of the container to form a region of subatmospheric pressure adjacent a first edge of the product and a region of high pressure adjacent a second edge of the product.

* * * * *

UNITED STATES PATENT AND TRADEMARK OFFICE
CERTIFICATE OF CORRECTION

PATENT NO. : 5,147,994
DATED : September 15, 1992
INVENTOR(S) : Doanld P. Smith, et al It is certified that error appears in the above-indentified patent and that said Letters Patent is hereby corrected as shown below:

Column 12, line 8, before "for" insert --means--.

Signed and Sealed this

Eighth Day of February, 1994

Attest:

BRUCE LEHMAN

*Attesting Officer*      *Commissioner of Patents and Trademarks*